United States Patent [19]
Leemann

[11] 4,077,257
[45] Mar. 7, 1978

[54] DEPTH GAUGE
[75] Inventor: Karl Leemann, Hallwil, Switzerland
[73] Assignee: Etablissement Financier et Industriel Intersub, Vaduz, Switzerland
[21] Appl. No.: 774,510
[22] Filed: Mar. 4, 1977
[30] Foreign Application Priority Data
Mar. 12, 1976 Switzerland .................. 3122/76
[51] Int. Cl.² .................................................. G01F 23/16
[52] U.S. Cl. .................................................... 73/300
[58] Field of Search ...................... 73/300, 299, 386; 116/129 F, 129 K

[56] References Cited
U.S. PATENT DOCUMENTS
3,188,864 6/1965 Dean ........................................ 73/300
3,677,087 7/1972 Alinari ..................................... 73/300
3,717,032 2/1973 Alinari ..................................... 73/300

FOREIGN PATENT DOCUMENTS
986,651 4/1951 France .................................... 73/386

Primary Examiner—Richard C. Queisser
Assistant Examiner—Joseph W. Roskos
Attorney, Agent, or Firm—Schroeder, Siegfried, Ryan, Vidas & Steffey

[57] ABSTRACT

A depth gauge from which lesser depths can be read off accurately on a scale which is expanded in the lower range. The expanded scale is achieved in that the component exposed to the pressure of the water is composed of at least two subcomponents, such as diaphragms or Bourdon tubes, which are subjected in succession to the effect of the water pressure.

6 Claims, 4 Drawing Figures

U.S. Patent    March 7, 1978    4,077,257
FIG. 1
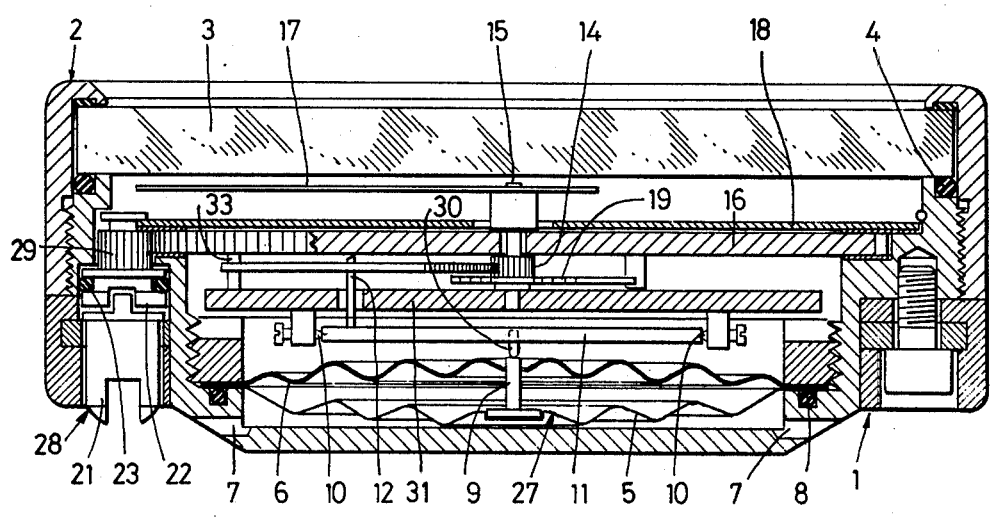
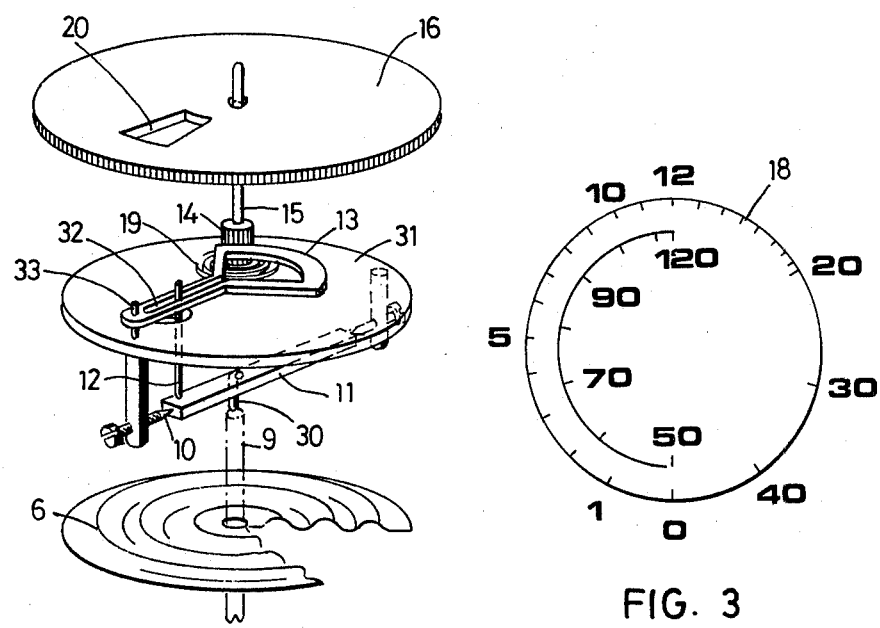
FIG. 2
FIG. 3

DEPTH GAUGE

This invention relates to depth gauges, and more particularly to a depth gauge of the type wherein a component deformable under the effect of water pressure is connected to transmission means for transmitting the extent of that deformation to an indicator device.

Manometers for measuring the depth of water are well known. In general, such instruments comprise a deformable component which may take the form of a diaphragm or a Bourdon tube. The deformation of the measuring component brought about by the water pressure is transmitted by a mechanism to an indicator from which the depth of the water can be read off.

These depth gauges have a substantially linear scale, i.e., in the case of depth gauges which are capable of indicating depths of up to 100 meters and more, for example, the depth of water is indicated only rather approximately for the first 10 meters. Now for divers, the problem arises of having to remain for a considerable length of time at various depth, for purposes of decompression, before finally coming to the surface. One or two such waiting stages are situated in the depth range of from one to ten meters. Because the prior art depth gauges provide poor and inaccurate readings in precisely that range, it is generally customary for divers to use two instruments, one for considerable depths and the other for slight depths.

It is an object of this invention to provide an improved depth gauge which accurately indicates both greater and lesser depths.

To this end, in the depth gauge according to the present invention, the improvement comprises a deformable component composed of a plurality of subcomponents successively exposed to the effect of the water pressure.

The pressure-responsive subcomponents are preferably Bourdon tubes or diaphragms.

Two preferred embodiments of the invention will now be described in detail with reference to the accompanying drawings, in which:

FIG. 1 is a cross-section through a first embodiment of the depth gauge,

FIG. 2 is an exploded view of the mechanism of the depth gauge of FIG. 1,

FIG. 3 is a view of the dial of the depth gauge of FIG. 1, and

Figure 4:
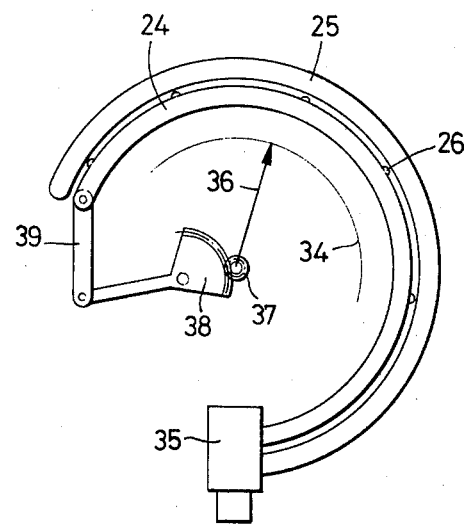
FIG. 4 is a top plan view of part of the mechanism in a second embodiment of the depth gauge.

The depth gauge illustrated in FIG. 1 comprises a case 1, containing the mechanism and the pressure-responsive means, and a cover ring 2 securing a glass 3. An O-ring 4 provides a fluid-tight closure between glass 3 and case 1. The pressure-responsive subcomponents take the form of circular diaphragms, preferably made of metal. A measuring diaphragm 5 is disposed beneath a supporting diaphragm 6. Water enters the space between the bottom of case 1 and measuring diaphragm 5 through an inlet 7. An O-ring 8 prevents the water from entering the remainder of the depth gauge. Diaphragms 5 and 6 are so shaped that the greater the pressure, the greater the surface area over which they contact one another. This provides a scale having an initial range expanded to several times the length of the end range, thus enabling accurate readings at lesser depths as well. The deformation of diaphragms 5 and 6 caused by the water pressure is transmitted via a transmission pin 9, preferably secured to measuring diaphragm 5, and via a pin 30, to a pivoting arm 11 suspended between two point bearings 10. A guide pin 12 secured to arm 11 engages a slot 32 in a toothed segment 13 which is pivotingly mounted on a plate 31 about a spindle 33. A vertical movement of transmission pin 9 causes arm 11 to pivot about its longitudinal axis and is converted by guide pin 12 into a pivoting movement of toothed segment 13. The latter meshes with a pinion 14 in which there is fixed a spindle 15 passing through a disk 16 having a toothed edge. Secured to spindle 15 above disk 16 is a pointer 17, each specific position of which corresponds to a respective amount of pressure exerted upon diaphgram 5. With the aid of a dial 18 disposed upon disk 16, the depth of water corresponding to the pressure can be read off. In order to keep arm 11 resting upon transmission pin 9, arm 11 is pressed against pin 9 when diaphragm 5 is not under pressure by a spiral spring 19 secured to pinion 14. The side faces of an aperture 20 in disk 16 act as stops for guide pin 12.

Since diving takes place not only in the sea but also in lakes which may have a surface-level differing from sea-level, the illustrated embodiment of the depth gauge includes facilities for calibrating the scale according to the respective surface-level Disposed at the side of case 1 for this purpose is a rotable cotter 21 with an adjacent rotary turret 22 having secured thereto a pinion 29 which engages the teeth of disk 16. An O-ring 23 fitted around turret 22 prevents water from entering case 1 along cotter 21. Disk 16 can be rotated by means of cotter 21, so that pointer 17 can be set to zero at the surface.

Another embodiment of the depth gauge is shown in part in FIG. 4. This gauge operates in basically the same manner as the embodiment described above, except that the diaphragms are replaced by two or more flattened metallic tubes 24, 25, so-called Bourdon tubes. Here, too, at lesser depths of water the inner tube 24 is first deformed. As depth and pressure increase, the outer tube 25 is additionally deformed, so that a scale 34 on which the initial range is expanded to several times the length of the end range is likewise obtained in this case. The water pressure acts via a connection piece 35 upon inner tube 24, which in turn actuates, via a lever 39, a toothed segment 38 meshing with a pinion 37 to which a pointer 36 is connected. In order that the touching Bourdon tubes 24 and 25 may slide against one another without jerking and as free of friction as possible, sliding means 26, preferably in the form of outwardly projecting plastic parts, are affixed to at least one of the facing sides of tubes 24, 25.

If a depth gauge is intended to be used for a still greater range, and if it is necessary that lesser depths of water also be read accurately, the possibility exists of disposing several diaphragms or Bourdon tubes above one another. The range of the scale and its expansion can be adapted to the particular requirements by selecting the number of pressure-responsive components and their elasticity constants accordingly.

What is claimed is:

1. In a depth gauge of the type wherein a component deformable under the effect of water pressure is connected to transmission means for transmitting the extent of said deformation to an indicator device, the improvement comprising a said deformable component composed of at least two subcomponents, the first of said subcomponents starting deformation at a first pressure and a second of said subcomponents starting deformation at a second pressure which is greater than said first pressure, said subcomponents being linked together to provide a composite deformation which varies non-linearly with variation in said water pressure.

2. The depth gauge of claim 1, wherein said subcomponents are diaphragms.

3. The depth gauge of claim 1, further comprising means operatable from outside said depth gauge for adjusting said indicator device.

4. The depth gauge of claim 1, wherein said subcomponents are Bourdon tubes.

5. The depth gauge of claim 4, further comprising sliding means disposed on at least one of facing sides of said Bourdon tubes.

6. The depth gauge of claim 5, wherein said sliding means are outwardly projecting plastic parts.

* * * * *